July 19, 1960 MASAHIKO FUKETA ET AL 2,945,416
RANGE FINDER OF THE OVERLAPPING IMAGE TYPE FOR CAMERAS AND THE LIKE
Filed May 18, 1955
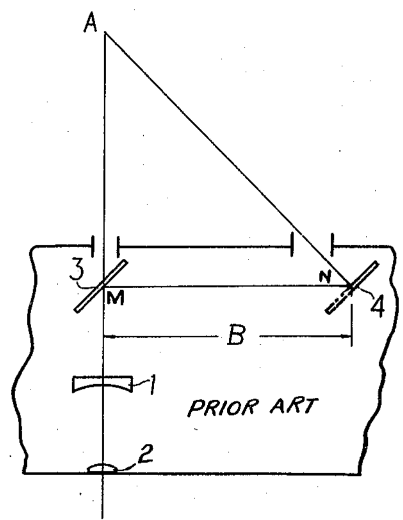
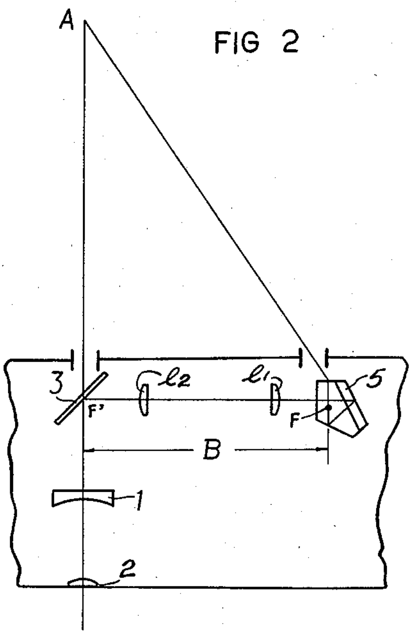
FIG 3
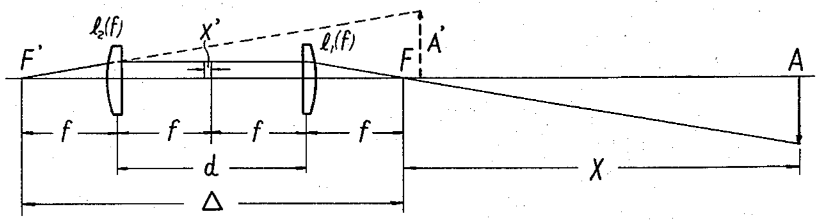
M. FUKETA AND S. MURAKAMI
INVENTORS.
BY
ATTORNEY.

United States Patent Office 2,945,416

Patented July 19, 1960

2,945,416

RANGE FINDER OF THE OVERLAPPING IMAGE TYPE FOR CAMERAS AND THE LIKE

Masahiko Fuketa, Nakano-ku, Tokyo, and Saburo Murakami, Kawasaki, Japan, assignors to Nippon Kogaku K.K., Tokyo, Japan, a corporation of Japan Filed May 18, 1955, Ser. No. 509,296
In Japan June 2, 1949

Public Law 619, Aug. 23, 1954
Patent expires June 2, 1969

2 Claims. (Cl. 88—2.4)

This invention relates to a range finder of the overlapping images type for cameras and the like. The object of this invention is to provide a construction wherein the difference between the long and short optical paths is eliminated so as to obtain a larger field of the overlapped images and simultaneously to obtain accurately overlapping images which cover the whole field of view, thereby to make the operation of overlapping the images quite easy and promote precision in range-finding.

A clearer concept of the scope and purpose of the invention may be obtained from the following description, taken in connection with the attached drawing, in which:

Fig. 1 shows the optical paths of a conventional range finder of the overlapping image type;

Fig. 2 shows the optical paths of an embodiment of this invention; and

Fig. 3 shows the optical paths of a telescopic optical system of one magnification according to this invention, omitting the reflector system for facility of explanation.

In conventional range finders of the overlapping image type for cameras, such as shown in Fig. 1, a direct view of the image of the object A through the semi-transparent glass 3, and a reflected image of the said object by the rotatable reflector 4, appear in the image formed by the objective 1 and the ocular 2. Since there is a difference $\Delta$ between the length of the light path of direct viewing and that of the reflected light path, the overlapped images are not of equal magnification, i.e. the images thus obtained are of different sizes. It follows therefore that when the images are overlapped outside the central region of the field of view, an error in range finding will occur. In order to minimize such error, conventional manufacturers find no other way than to limit the field of view of such overlapped images to a relatively small size. In so doing, however, unless the users overlap such images in the center of the field of view, errors in range finding cannot be eliminated in the current practice.

In our invention, to eliminate the effect of the abovementioned difference in optical paths, a telescopic optical system of unit magnification is inserted in the deflected optical path as shown in Fig. 2, so that the distance between the virtual image A′ (see Fig. 3) of the object A thus produced, and the objective 1 is equal to such distance on the side of its direct view thereby making the respective magnifications in both optical paths equal.

The manner of operation will further be set forth in some detail with reference to Fig. 3 as mentioned below:

With the difference in the length of the optical paths from object A designated by $\Delta$, and with the focal length $f$ of lenses $l_1$ and $l_2$ in the telescopic optical system inserted therein is made $$f=\frac{\Delta}{4}$$

and the distance between both lenses is made $2f=d$, the distance between the front focus F of the lens $l_1$, and the rear focus F′ of the lens $l_2$ will naturally be $\Delta$. If the distance between the point F and the object A is taken as $x$ and the position of the image of the object A obtainable through the lens $l_1$, that is, the distance from the rear focus of the lens $l_1$ is denominated by $x'$, we obtain $$x'=-\frac{f^2}{x}$$

It is further noted that as the front focus of lens $l_2$ coincides with the rear focus of the lens $l_1$ and the focal distance of the lens $l_2$ is selected as $f$ the relation between the object and the image will be reversed to that in lens $l_1$ and, consequently the virtual image A′ of the object passing through the lenses $l_1$ and $l_2$ will be formed at a distance $x$ from the rear focus F′ of lens $l_2$.

$$\bar{F'}\bar{A'}=x=\bar{F}\bar{A}$$

It will be obvious that the image A′ of the object A positioned at a distance $x$ from F will be formed at a distance $x$ from F′ which is at a distance equal to $\Delta$ from F and the object A and the image A′ will accordingly satisfy the relation of unit magnification, so as to attain the object of this invention.

Here it must be pointed out however that when the lenses $l_1$ and $l_2$ are inserted, the image obtained will necessarily be inverted and that it is necessary to use such reflecting pentagonal prism 5 having a roof, as exemplified in Figure 2, to satisfy the purpose of this invention. As is well known in the art, correction for the deflection angle is obtainable by shifting one of the convex lenses $l_1$ and $l_2$ laterally of the lens system $l_1 l_2$ of unit magnification.

What we claim is:

1. A range finder of the overlapping image type comprising a first viewing aperture, a semitransparent reflector fixed in position, an objective, an eyepiece aligned with the objective, the reflector and the first aperture to pass the incident light rays from an object viewed in substantially a straight path to the eyepiece, a second viewing aperture spaced from the first aperture a fixed distance, a pentagonal prism having a roof for inversion receiving the light from the second aperture and reflecting it in reverted condition to the semitransparent reflector, the reflector reflecting the light from the prism through the objective to the eyepiece in superimposed relation to the light from the first aperture, and a pair of spaced convex lenses between the prism and the semitransparent reflector of which each lens has a focal length equal to one quarter the difference in the lengths of the light paths from the object viewed directly through the semi-transparent reflector and indirectly therethrough by way of the pentagonal prism, the lenses of the pair being at equal distances from the prism and reflector respectively and spaced a distance equal to twice their focal length from each other.

2. A range finder of the overlapping image type comprising two laterally spaced apertures, an eyepiece, a first optical system for viewing through the eyepiece an object of which the range is to be found having at least an objective aligned and cooperating with one aperture, and a second optical system for viewing said object and including a semi-transparent light combining means, a pentagonal prism adapted to reflect light incident thereupon from the object into the combining means, and from the combining means into the objective in erect condition and a lens array between the prism and the combining means for magnifying the image formed by the second optical system substantially to the same magnitude as the image formed by the first optical system, the lens array of the second optical system comprising a pair of lenses each of which has a focal length equal to one-fourth the difference in the lengths of the light paths from the object being viewed through the eyepiece over the first and second optical paths by way of the light combining means and spaced at twice such focal length from each other and at substantially one focal length from each the prism and the combining means.

References Cited in the file of this patent

UNITED STATES PATENTS

| | | |
|---|---|---|
| 2,208,222 | Mische | July 16, 1940 |
| 2,336,330 | Wittel | Dec. 7, 1943 |